(12) United States Patent
Nakashima et al.

(10) Patent No.: US 9,833,742 B2
(45) Date of Patent: Dec. 5, 2017

(54) CATION EXCHANGE MEMBRANE AND METHOD FOR PRODUCING SAME

(71) Applicants: KURARAY CO., LTD., Kurashiki-shi (JP); YAMAGUCHI UNIVERSITY, Yamaguchi-shi (JP)

(72) Inventors: Takahiro Nakashima, Kurashiki (JP); Atsushi Jikihara, Kurashiki (JP); Takashi Wakui, Kurashiki (JP); Mitsuru Higa, Ube (JP)

(73) Assignees: KURARAY CO., LTD., Kurashiki-shi (JP); YAMAGUCHI UNIVERSITY, Yamaguchi-shi (JP)

( * ) Notice: Subject to any disclaimer, the term of this patent is extended or adjusted under 35 U.S.C. 154(b) by 0 days.

(21) Appl. No.: 14/681,209

(22) Filed: Apr. 8, 2015

(65) Prior Publication Data

US 2015/0209732 A1    Jul. 30, 2015

Related U.S. Application Data

(63) Continuation of application No. PCT/JP2013/076375, filed on Sep. 27, 2013.

(30) Foreign Application Priority Data

Oct. 10, 2012    (JP) ................. 2012-225466

(51) Int. Cl.
*B01D 61/42* (2006.01)
*C02F 1/469* (2006.01)
(Continued)

(52) U.S. Cl.
CPC .......... *B01D 61/422* (2013.01); *B01D 69/02* (2013.01); *B01D 71/38* (2013.01); *B01D 71/80* (2013.01);
(Continued)

(58) Field of Classification Search
USPC ............................................ 521/27; 525/418
See application file for complete search history.

(56) References Cited

U.S. PATENT DOCUMENTS

| | | | |
|---|---|---|---|
| 4,565,854 A | 1/1986 | Sato et al. | |
| 5,409,785 A | 4/1995 | Nakano et al. | |

(Continued)

FOREIGN PATENT DOCUMENTS

| | | | |
|---|---|---|---|
| CN | 101180760 A | 5/2008 | |
| CN | 102458618 A | 5/2012 | |

(Continued)

OTHER PUBLICATIONS

U.S. Appl. No. 14/747,032, filed Jun. 23, 2015, Jikihara, et al.
(Continued)

*Primary Examiner* — Mark Kaucher
*Assistant Examiner* — Henry Hu
(74) *Attorney, Agent, or Firm* — Oblon, McClelland, Maier & Neustadt, L.L.P.

(57) ABSTRACT

Provided is a cation exchange membrane having a stable ion exchange performance during usage, being excellent in basic properties such as membrane resistance and ion transportation as well as strength, and useful for electrodialysis and a method for producing the same. The cation exchange membrane is composed of a polyvinyl alcohol copolymer including an anionic group-containing anionic polymer segment and a vinyl alcohol polymer segment, and having a microphase separation structure having a domain size (X) in a range from 0 nm<X≤150 nm. The method is composed of forming a membrane from a polyvinyl alcohol copolymer which is adjusted to contain salts in a proportion that the salt weight (C) relative to the polyvinyl alcohol copolymer weight (P) is [(C)/(P)] of 4.5/95.5 or lower.

16 Claims, 2 Drawing Sheets

(51) Int. Cl.

| | |
|---|---|
| C08F 297/00 | (2006.01) |
| C08J 5/22 | (2006.01) |
| C08F 293/00 | (2006.01) |
| B01D 69/02 | (2006.01) |
| B01D 71/38 | (2006.01) |
| B01D 71/80 | (2006.01) |
| B01D 71/82 | (2006.01) |
| B01J 39/19 | (2017.01) |

(52) U.S. Cl.
CPC ............ *B01D 71/82* (2013.01); *B01J 39/19* (2017.01); *C08F 293/00* (2013.01); *C08F 297/00* (2013.01); *C08J 5/2231* (2013.01); *B01D 2325/42* (2013.01); *C02F 1/4693* (2013.01); *C08J 2329/04* (2013.01); *C08J 2353/00* (2013.01)

(56) References Cited

U.S. PATENT DOCUMENTS

| | | | |
|---|---|---|---|
| 7,396,880 | B2 | 7/2008 | Goldbach et al. |
| 7,629,426 | B2 | 12/2009 | Goldbach |
| 7,781,529 | B2 | 8/2010 | Goldbach et al. |
| 7,803,891 | B2 | 9/2010 | Goldbach et al. |
| 7,815,986 | B2 | 10/2010 | Goldbach et al. |
| 8,182,949 | B2 | 5/2012 | Ohgi et al. |
| 9,266,069 | B2 | 2/2016 | Higa et al. |
| 2006/0269815 | A1 | 11/2006 | Goldbach et al. |
| 2008/0241630 | A1 | 10/2008 | Goldbach et al. |
| 2008/0242805 | A1* | 10/2008 | Goldbach ......... B01D 67/0093 525/418 |
| 2008/0242819 | A1 | 10/2008 | Goldbach |
| 2008/0242833 | A1 | 10/2008 | Goldbach et al. |
| 2010/0098997 | A1 | 4/2010 | Ohgi et al. |
| 2010/0196782 | A1 | 8/2010 | Izuhara et al. |
| 2012/0031834 | A1* | 2/2012 | Higa ................ B01D 61/44 210/500.42 |
| 2013/0052564 | A1 | 2/2013 | Sakai et al. |

FOREIGN PATENT DOCUMENTS

| | | |
|---|---|---|
| JP | 59-187003 * | 10/1984 |
| JP | 59-189113 | 10/1984 |
| JP | 2-196233 | 8/1990 |
| JP | 3-168239 | 7/1991 |
| JP | 5-174856 | 7/1993 |
| JP | 6-076838 | 3/1994 |
| JP | 2008-545834 A | 12/2008 |
| JP | 2011-103295 | 5/2011 |
| WO | WO 2006/127309 A2 | 11/2006 |
| WO | WO 2008/018487 | 2/2008 |
| WO | WO 2008/090774 | 7/2008 |
| WO | WO-2008/090774 A1 * | 7/2008 |
| WO | WO 2010/119858 | 10/2010 |

OTHER PUBLICATIONS

International Search Report dated Dec. 17, 2013 in PCT/JP2013/076375 dated Sep. 27, 2013.

Mitsuru Higa et al. "Characterization of cation-exchange membranes prepared from poly(vinyl alcohol) and poly(vinyl alcohol-b-styrene sulfonic acid)", International Journal of Hydrogen Energy, vol. 37, Issue 7, pp. 6161-6168 (Jul. 16, 2011).

Extended European Search Report dated May 10, 2016 in Patent Application No. 13844805.5.

Akhil K. Sen, et al., "On the Importance of Purification of Sodium Polystyrene Sulfonate", ISRN Analytical Chemistry, vol. 51, No. 3, XP055269188, Nov. 28, 2011, 6 Pages.

Combined Taiwanese Office Action and Search Report dated Nov. 14, 2016 in Patent Application No. 102136314 (with English translation of the Search Report and English translation of the categories of cited documents).

Combined Chinese Office Action and Search Report dated Oct. 11, 2016 in Chinese Patent application No. 201380052607.8 (with partial English language translation and English translation of categories of cited documents).

Notification of Reason(s) for Rejection dated Jul. 4, 2017 in Japanese Patent Application No. 2014-540802 (with English language summary).

Office Action dated Jun. 20, 2017 in Chinese Patent Application No. 201380052607.8 (with English-language summary).

* cited by examiner

CATION EXCHANGE MEMBRANE AND METHOD FOR PRODUCING SAME

CROSS REFERENCE TO THE RELATED APPLICATION

This application is a continuation application, under 35 U.S.C. §111(a), of international application No. PCT/JP2013/076375, filed on Sep. 27, 2013, which claims priority to Japanese Patent Application No. 2012-225466, filed on Oct. 10, 2012, the entire disclosure of which is herein incorporated by reference as a part of this application.

FIELD OF THE INVENTION

The present invention relates to a cation exchange membrane being formed of a polyvinyl alcohol copolymer having an anionic group, and a method thereof.

BACKGROUND ART

Ion exchange membranes have been used as ion-separation membranes in electrodialysis or diffusion dialysis methods for a wide variety of applications such as seawater concentration, removal of salts or nitrate nitrogen from underground brine or brackish water for making drinking water, removal of salts in food production, concentration of active ingredients for medical pharmaceutical product, and others. The ion exchange membranes used for these applications are typically styrene-divinylbenzene type homogeneous ion exchange membranes. Since various technologies have been developed in these membranes for ion selectivity between monovalent and divalent ions, higher selectivity of a specific ion species, reduction in membrane resistance and others, these membranes can provide industrially useful separation techniques.

In the above-mentioned fields such as foods, medical and pharmaceutical products, and agrochemical fields, salts are easily and generally formed as by-products during synthesis of organic compounds. The resulting salts contained in the organic compounds are usually separated using electrodialysis. The electrodialysis desalination can be carried out by alternately arranging a cation exchange membrane and an anion exchange membrane, followed by applying a direct current voltage to electrodes, so that cations travel to the cathode (−) side of the cation exchange membrane and anions travel to the anode (+) side of the anion exchange membrane. As a result, cations and anions are concentrated in concentration chambers each comprising a cation exchange membrane on the cathode side and an anion exchange membrane on the anode side so as to obtain a concentrated electrolyte liquid, and further by removing salts from the concentrated electrolyte liquid, desalination is completed. In the electrodialysis desalination, when electrolytes in liquid to be treated pass through the ion exchange membranes, permeability of ionic species is affected by both ion permeation pathway in the membrane and hydrated ionic radius of the ionic species.

There has been reported a cation exchange membrane comprising a polyvinyl alcohol copolymer. Patent Document 1 describes a cation exchange membrane obtained by casting on a porous support a polymer composition comprising a polystyrene sulfonic acid and a polyvinyl alcohol, followed by thermal-crosslinking of the casted resultant.

Patent Document 2 describes a membrane holding an organic polymeric electrolyte in a three-dimensional network structure formed by cross-linked chains of a polymeric alcohol. Patent Document 2 specifically describes to use a polyvinyl alcohol as the polymeric cross-linkable alcohol, and a polystyrene sulfonic acid as the organic polymeric electrolyte. In order to prevent inhibition of crystal growth in the polyvinyl alcohol caused by heat treatment, sodium bromide contained in the polystyrene sulfonic acid is removed.

Patent Document 3 describes a polymer electrolyte membrane comprising as a main constituent a cross-linked block copolymer comprising a polyvinyl alcohol block and an anionic group-containing polymer block.

RELATED ART DOCUMENTS

Patent Documents

[Patent Document 1] JP Laid-open Patent Publication No. 5-174856
[Patent Document 2] JP Laid-open Patent Publication No. 6-76838
[Patent Document 3] WO 2008/090774 A1

SUMMARY OF THE INVENTION

Problems to be Solved by the Invention

The membrane of polymer blend disclosed in Patent Document 1 has a problem of poor durability because the heat treatment contributes to crosslinking of only crystalline regions in polyvinyl alcohol, leading to elution of polystyrene sulfonic acid which is not crosslinked.

The ion exchange membrane disclosed in Patent Document 2, in the same way as the membrane of Patent Document 1, also has a problem of poor durability because the heat treatment contributes to crosslinking of only crystalline regions in polyvinyl alcohol, leading to elution of polystyrene sulfonic acid which is not crosslinked.

The ion exchange membrane disclosed in Patent Document 3 prevents elution of ionic polymers by introducing an anionic group into a polyvinyl alcohol copolymer during copolymerization. However, such an ion exchange membrane is produced not only by directly using p-styrene sulfonic acid monomers which generally contain a large amount of salts as impurities but also by employing as a polymerization initiator potassium persulfate which generates ionic residues as decomposition product. As a result, salting-out in polyvinyl alcohol segments easily causes phase separation between the polyvinyl alcohol segments and the styrene sulfonic acid segments. Since ion permeation pathway in the membrane structure changes depending on the polymer phase separation, a membrane with larger phase separation gradually deteriorates in membrane performance due to elution of the ionic groups. In the case where deterioration is severe, there has been a problem that the membrane causes marked swelling and/or breakage in a relatively short period of time.

The present invention has been made to solve the problems of the above conventional technique. It is therefore an object of the present invention to provide an ion exchange membrane having excellent fundamental characteristics regarding membrane resistance, swelling and ion selectivity, as well as enhanced durability, and also being useful for electrodialysis. In particular, the problem to be solved by the present invention is to provide a cation exchange membrane comprising a polyvinyl alcohol copolymer which comprises an anionic group-containing anionic polymer segment and a vinyl alcohol polymer segment, in which the membrane has an excellent durability by suppressing phase separation in micron scale in the membrane without changing ion permeation pathway in the membrane structure.

Means for Solving the Problems

The inventors of the present invention made an intensive study to achieve the above object and have found that the microphase separation is affected by the content of salts contained as impurities in the cation exchange membrane comprising a polyvinyl alcohol copolymer having an anionic group-containing anionic polymer segment and a vinyl alcohol polymer segment, and further found that lowered content of salts enables to reduce size of domains so as to suppress phase separation in micron scale, leading to excellent electrical properties with respect to charge density and membrane resistance, and finally have completed the present invention.

A first aspect of the present invention is a cation exchange membrane comprising a polyvinyl alcohol copolymer which comprises an anionic group-containing anionic polymer segment and a vinyl alcohol polymer segment, and having a microphase separation structure having a domain size (X) in a range from 0 nm<X≤150 nm.

In the present invention, the term "microphase separation" refers to periodic structure in a copolymer comprising two or more segments of polymer chains in which the same polymer segments aggregate while different polymer segments segregate from each other so as to form a self-assembled periodic polymer segment structure having a scale from nano-size to submicron-size. More specifically, in a polyvinyl alcohol comprising a vinyl alcohol polymer segment and an anionic group-containing anionic polymer segment, each of the two segments separately aggregate with each other so as to form a microphase separation in which one segment as domains is dispersed in the other segment as matrix, preferably the anionic group-containing anionic polymer segment as domains is dispersed in the vinyl alcohol polymer segment as matrix to form a microphase separation.

In the present invention, the term "domain" refers to an aggregate in which the same types of segments come together in one or more polymer chains.

Further, the polyvinyl alcohol copolymer may also contain a vinyl alcohol polymer without anionic group.

The polyvinyl alcohol copolymer may preferably have a crosslinking structure introduced thereinto.

The polyvinyl alcohol copolymer may be preferably an anionic block copolymer comprising a vinyl alcohol polymer block and an anionic group-containing anionic polymer block.

Alternatively, the polyvinyl alcohol copolymer may be preferably an anionic graft copolymer comprising a vinyl alcohol polymer block and an anionic group-containing anionic polymer block.

The cation exchange membrane preferably has an ion exchange capacity of 0.30 meq/g or higher. The cation exchange membrane preferably has a membrane resistance of 10 Ωcm² or lower.

A second aspect of the present invention is a method for producing a cation exchange membrane, comprising forming a membrane from the polyvinyl alcohol copolymer which is adjusted to contain salts in a proportion that the salt weight (C) relative to the polyvinyl alcohol copolymer weight (P) is [(C)/(P)] of 4.5/95.5 or lower.

The above mentioned salts are inevitable impurities in the polyvinyl alcohol copolymer. Such salts can be removed by carrying out precipitation or re-precipitation from a solution of the polyvinyl alcohol copolymer containing the salts so as to provide a polyvinyl alcohol copolymer containing the salts relative to the copolymer in a weight ratio of a predetermined value or lower.

After membrane formation, the obtained membrane is preferably crosslinked.

The cation exchange membrane is preferably produced by forming a film from a polyvinyl alcohol copolymer solution containing salts, heat-treating the obtained film at a temperature of 100° C. or higher, carrying out crosslinking treatment of the heated film with a dialdehyde compound under acidic condition in water, an alcohol, or a mixed solvent thereof, and washing the crosslinked resultant with water to obtain a membrane.

It should be noted that any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

Effect of the Invention

The cation exchange membrane according to the present invention is a membrane comprising a polyvinyl alcohol copolymer having an anionic polymer segment and a vinyl alcohol polymer segment. By forming the membrane from the polyvinyl alcohol copolymer with a reduced content of salts contained in the copolymer as impurities, the obtained membrane can suppress phase separation in micron scale between the vinyl alcohol polymer segment and the anionic polymer segment so as to obtain a membrane having a specific domain size of 150 nm or less. As a result, the cation exchange membrane has a reduced membrane resistance because the vinyl alcohol polymer segment has high hydrophilicity. Further, as described above, since phase separation in micron scale is suppressed, dense ion permeation pathways are formed in the membrane structure so as to achieve high durability and stable electrodialysis in an efficient way for a long period of time.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims.

DESCRIPTION OF EMBODIMENTS (Cation Exchange Membrane)

The cation exchange membrane of the present invention includes a polyvinyl alcohol copolymer comprising an anionic group-containing anionic polymer segment and a vinyl alcohol polymer segment. In the polyvinyl alcohol copolymer, covalent bonding is normally formed between vinyl alcohol polymer segments and anionic polymer segments. In the present invention, the term "polymer segment" means a polymer chain comprising repeating single monomer units in which two or more units of same monomers are bonded with each other, and can be used in a concept encompassing polymer blocks in block copolymers as well as polymer blocks corresponding to trunk (backbone) or branch chains in graft polymers. Since the anionic group-containing anionic polymer segment may contain an anionic group at a polymer terminal, such an anionic group-containing anionic polymer segment is not necessary to have repeating monomer units each having an anionic group.

Although the cation exchange membrane according to the present invention comprises a polyvinyl alcohol copolymer having an anionic group-containing anionic polymer segment and a vinyl alcohol polymer segment as described above, the cation exchange membrane may comprise, in addition to the copolymer, a polyvinyl alcohol polymer without an anionic group, the polyvinyl alcohol polymer being not bonded to an anionic polymer segment, and/or an anionic polymer being not bonded to a vinyl alcohol polymer within a range not affecting phase separation structure.

The inventors of the present invention have found that by forming a membrane from a polyvinyl alcohol copolymer with a reduced amount of salts contained therein, the polyvinyl alcohol copolymer constituting the membrane exhibits a microphase separation structure so as to obtain the cation exchange membrane according to the present invention with a reduced domain size of 150 nm or below. The cation exchange membrane according to the present invention is usually provided to practical use after crosslinking of vinyl alcohol polymer segments. The cation exchange membranes having a specific domain size (X) in a range from 0 nm<X≤150 nm can achieve unchanged ion permeation pathway, stable membrane structure, excellent electrical properties such as membrane resistivity and charge density, and are useful as cation exchange membranes for electrodialysis. The above domain size (X) is more preferably in a range of 1 nm≤X≤130 nm, and further preferably 3 nm≤X≤100 nm.

The cation exchange membrane according to the present invention is a hydrophilic ion exchange membrane because the membrane comprises a polyvinyl alcohol copolymer having a vinyl alcohol polymer segment as described above. This hydrophilic characteristic is advantageously used to suppress fouling of the membrane caused by adhesion of organic fouling substances in the liquid to be treated. Herein what the constituting polymer is hydrophilic means that the constituting polymer without functional groups (anionic groups) required to be anionic polymers has hydrophilicity by itself. In other words, when the constituting polymer is a hydrophilic polymer, it is possible to obtain a cation exchange membrane having high hydrophilicity and also to suppress a problem that the performance of cation exchange membranes is reduced because of adhesion of organic fouling substances in the liquid to be treated. Further, such a membrane advantageously has enhanced membrane strength.

(Anionic Polymer)

The anionic polymer constituting an anionic polymer segment used in the present invention is a polymer containing an anionic group in the molecular chain. The anionic group may be in a main chain, in a side chain, and/or at a terminal of the polymer chain. Examples of anionic groups may include a sulfonate group, a carboxylate group, a phosphonate group, and the like. Further, anionic groups may also include a functional group such as a sulfonic acid group, a carboxyl group and a phosphonic acid group, at least a part of which can be converted into a sulfonate group, a carboxylate group, and/or a phosphonate group in water. Among them, preferable anionic groups include a sulfonate group from the viewpoint of high value of ionic dissociation constant. The anionic polymer may comprise single species of anionic group or two or more species of anionic groups. Counter cation of the anionic group is not particularly limited to a specific one, and may include, for example, hydrogen ion, an alkali metal ion, and the like. Among them, preferable counter cations include alkali metal ions from the viewpoint of rare corrosion problems in equipment. The anionic polymer may comprise single species of counter cation or two or more species of counter cations.

The anionic polymers used in the present invention may be a polymer consisting of a structural unit containing an anionic group described above, or may be a polymer comprising a structural unit containing an anionic group described above and further comprising a structural unit without anionic group. In addition, these polymers may be crosslinkable. The anionic polymer may comprise single species of anionic polymer or two or more species of anionic polymers. Further the anionic polymer may be a mixture of an anionic polymer and a polymer other than the anionic polymer. Herein the polymer other than the anionic polymer may be preferably a polymer other than cationic polymer.

As anionic polymers, examples of structural units may include formulae represented by the following general formulae (1) and (2).

[Chem. 1]

(1)

In the formula $R^5$ represents hydrogen atom or methyl group; G represents —$SO_3H$, —$SO_3$-$M^+$, —$PO_3M^+$, —$PO_3$-$M^+$, —$CO_2H$ or —$CO_2M^+$; and $M^+$ represents ammonium ion or an alkali metal ion.

Examples of the anionic polymers containing a structural unit represented by the general formula (1) may include a homopolymer or copolymer of 2-acrylamide-2-methylpropane sulfonic acid, and others.

(2)

In the formula, $R^5$ represents hydrogen atom or methyl group; T represents a phenylene or naphthylene group which may be substituted by methyl group; and G has the same meaning as in the general formula (1).

Examples of anionic polymers containing a structural unit represented by the general formula (2) may include a homopolymer or copolymer of p-styrene sulfonate, such as sodium p-styrene sulfonate, and others.

Anionic polymers may also include a homopolymer or copolymer of a sulfonic acid (for example, vinyl sulfonic acid and (meth)allyl sulfonic acid) or a salt thereof, a homopolymer or copolymer of a dicarboxylic acid or a derivative thereof (for example, fumaric acid, maleic acid, itaconic acid, maleic anhydride, itaconic anhydride) or a salt thereof, and the like.

In the general formula (1) or (2), G is preferably a sulfonate group, a sulfonic acid group, a phosphonate group or a phosphonic acid group those being capable of providing higher charge density. In the general formulae (1) and (2), examples of alkali metal ions represented by the general formula $M^+$ may be sodium ion, potassium ion, lithium ion, and others.

(Vinyl Alcohol Polymer Segment)

In the present invention, a polyvinyl alcohol constituting the vinyl alcohol polymer segment may be a saponified vinyl ester polymer that is obtained by polymerization of vinyl ester monomers in which a vinyl ester unit is changed into a vinyl alcohol unit. Examples of vinyl ester monomers may include vinyl formate, vinyl acetate, vinyl propionate, vinyl valerate, vinyl laurate, vinyl stearate, vinyl benzoate, vinyl pivalate, vinyl versatate, and others. Among them, preferable one includes vinyl acetate.

In the copolymerization of the vinyl ester monomers, reactant mixture may optionally include a copolymerizable monomer other than the vinyl ester monomers in a range (a proportion of preferably 50 mol % or less, more preferably 30 mol % or less) that does not impair the effect of the invention.

Examples of monomers copolymerizable with the vinyl ester monomers may include an olefin having 2 to 30 carbon atoms such as ethylene, propylene, 1-butene, and isobutene; acrylic acid and a salt thereof; an acrylic ester such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and a salt thereof; a methacrylic ester such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl acrylate; acrylamide and a derivative thereof such as N-methyl acrylamide, N-ethyl acrylamide, N, N-dimethylacrylamide, diacetone acrylamide, acrylamide propanesulfonic acid and a salt thereof, acrylamide propyldimethylamine and a salt thereof, and N-methylol acrylamide and a derivative thereof; methacrylamide and a derivative thereof such as N-methyl methacrylamide, N-ethyl methacrylamide, methacrylamide propanesulfonic acid and a salt thereof, methacrylamide propyldimethylamine and a salt thereof, and N-methylol methacrylamide and a derivative thereof; an N-vinyl amide such as N-vinyl formamide, N-vinyl acetamide, and N-vinyl pyrrolidone; a vinyl ether such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; a nitrile such as acrylonitrile and methacrylonitrile; a vinyl halide such as vinyl chloride, vinylidene chloride, vinyl fluoride, and vinylidene fluoride; an allyl compound such as allyl acetate and allyl chloride; maleic acid and a salt or ester thereof; itaconic acid and a salt or ester thereof; a vinylsilyl compound such as vinyl trimethoxysilane; isopropenyl acetate; and the like.

In the structural units of polyvinyl alcohol copolymer, the structural units other than the anionic group-containing structural unit can be independently selected, but the structural units other than the anionic group-containing structural unit preferably formed from monomers each having a same structural unit. In such a case, increased affinity between the domains makes it possible to enhance the mechanical strength of the cation exchange membrane. The polyvinyl alcohol copolymer may preferably have same structural units in a proportion of 50 mol % or higher, and more preferably 70 mol % or higher.

Further, from the viewpoint of desirable hydrophilicity, the polyvinyl alcohol copolymer particularly preferably comprises a vinyl alcohol unit as the same structural unit. The vinyl alcohol unit can be used for chemical crosslinking between the domains with a crosslinking agent such as glutaraldehyde so as to make the cation exchange membrane to have a further increased mechanical strength.

As described above, according to the present invention, the polyvinyl alcohol copolymer comprising an anionic polymer segment and a vinyl alcohol polymer segment preferably has a structure in which the vinyl alcohol polymer segment is bonded to the anionic polymer segment.

The cation exchange membrane according to the present invention comprises a polyvinyl alcohol copolymer having an anionic polymer segment and a vinyl alcohol polymer segment as described above, and may comprise a mixture including a vinyl alcohol polymer without an anionic group in addition to a polyvinyl alcohol copolymer having an anionic polymer segment and a vinyl alcohol polymer segment.

(Block or Graft Copolymer)

According to the present invention, the polyvinyl alcohol copolymer may be preferably a block or graft copolymer comprising an anionic polymer segment and a vinyl alcohol polymer segment. Among them, preferred one is a block copolymer. When the block copolymer is used to constitute a cation exchange membrane, the cation exchange membrane can have both ion permeability function and dimensional stability by effectively using the vinyl alcohol polymer block responsible for improve strength as a whole, suppression of swelling and shape retention in the membrane, in combination with the anionic polymer block obtained by polymerization of monomers each having an anionic group responsible for permeation of cations. The structural unit of the polymer block obtained by polymerization of anionic monomers is not limited to a specific one, and may include, for example, the units represented by the general formula (1) and/or (2). Among them, from the viewpoint of easy availability, p-styrene sulfonate (a salt of styrene sulfonic acid) or 2-acrylamide-2-methyl propane sulfonate (a salt of 2-acrylamide-2-methyl propane sulfonic acid) may be preferably used as polymerizable monomers constituting an anionic polymer, and preferably usable copolymers include an anionic block copolymer comprising a vinyl alcohol polymer block and an anionic polymer block obtained by polymerization of p-styrene sulfonate, an anionic block copolymer comprising a vinyl alcohol polymer block and an anionic polymer block obtained by polymerization of 2-acrylamide-2-methyl propane sulfonate, and the like.

Alternatively, as graft copolymers, there may be mentioned a graft polymer comprising an anionic polymer segment as a trunk or backbone chain or and a vinyl alcohol polymer segment as a graft chain, and a graft polymer comprising a vinyl alcohol polymer segment as a trunk or backbone chain and an anionic polymer segment as a graft chain. The graft structure is not particularly limited to a specific one in the present invention. The graft copolymer may be preferably a graft copolymer comprising a vinyl alcohol polymer segment as a trunk chain and an anionic polymer segment as a graft chain because it is easy to achieve the physical strength. The graft copolymerization method can embrace known methods.

(Method of Manufacturing Block Copolymer)

According to the present invention, a method for producing a block copolymer comprising an anionic polymer block obtained by polymerizing anionic monomers and a vinyl alcohol polymer block is roughly classified into the following two methods: (1) a method comprising producing a predetermined block copolymer and bonding or introducing an anionic group into a specific block chain in the copolymer; or (2) a method comprising producing a predetermined block copolymer by polymerizing at least one species of anionic group-containing monomers. As for the method (1), there may be mentioned a method preparing a polyvinyl alcohol having a mercapto group(s) at its terminal(s), polymerizing one or more kinds of monomers in the presence of the polyvinyl alcohol to obtain a block copolymer, and introducing an ionic group into one or more polymer units in the block copolymer. As for the method (2), there may be mentioned a method preparing a polyvinyl alcohol having a mercapto group(s) at its terminal(s), and radically polymerizing at least one kind of anionic group-containing monomers in the presence of the polyvinyl alcohol to obtain a block copolymer. These methods are preferably used from the viewpoint of industrial feasibility. Particularly preferable methods include a method preparing a polyvinyl alcohol having a mercapto group(s) at its terminal(s), and radically polymerizing at least one kind of anionic group-containing monomers in the presence of the polyvinyl alcohol to obtain a block copolymer because the method achieves easy control of the constituent monomer species and amount thereof in each anionic polymer block in the block copolymer comprising a vinyl alcohol polymer block and an anionic polymer block obtained by polymerizing anionic monomers. The block copolymer having an anionic polymer block obtained by polymerizing anionic monomers and a vinyl alcohol polymer block may comprise a polyvinyl alcohol having a mercapto group(s) at its terminal(s) in unreacted state.

The polyvinyl alcohol having a mercapto group(s) at a terminal(s) used in the preparation of these block copolymers can be obtained by a method described in JP Laid-open Patent Publication No. 59-187003 and the like. That is, there may be mentioned a method of saponifying a polyvinyl ester obtained by radical polymerization of vinyl ester monomers (for example, vinyl acetate) in the presence of a thiol acid. As a method for producing a block copolymer from such a polyvinyl alcohol having a mercapto group(s) at its terminal(s) and anionic group-containing monomers, there may be mentioned a method described in JP Laid-open Patent Publication No. 59-189113 and the like. That is, a block copolymer can be obtained by radically polymerizing one or more species of anionic group-containing monomers in the presence of the polyvinyl alcohol having a mercapto group(s) at its terminal(s). The radical polymerization can be carried out using a known method, such as bulk polymerization, solution polymerization, pearl polymerization, emulsion polymerization, and the like. Preferable methods include a method using a solvent dissolvable a polyvinyl alcohol having a mercapto group(s) at its terminal(s), the solvent mainly comprising, for example, water and/or dimethyl sulfoxide. The polymerization process may be carried out using either a batch process, a semi-batch process or a continuous process.

The radical polymerization can employ a typical radical polymerization initiator, for example, 2,2'-azobisisobutyronitrile, benzoylperoxide, lauroylperoxide, diisopropylperoxycarbonate, 4,4'-azobis-(4-cyanopentanoic sodium), 4,4'-azobis-(4-cyano-pentanoic ammonium), 4,4'-azobis-(4-cyano-pentanoic potassium), 4,4'-azobis-(4-cyano-pentanoic lithium), 2,2'-azobis-{2-methyl-N-[1,1'-bis(hydroxymethyl)-2-hydroxyethyl]propionamide}, potassium persulfate, ammonium persulfate and others, selected depending on the polymerization system. In aqueous polymerization system, polymerization may be initiated by redox reactions between mercapto group(s) bonded to a terminal(s) of the vinyl alcohol polymer and an oxidizing agent such as potassium bromate, potassium persulfate, ammonium persulfate, hydrogen peroxide and others, or initiated by using 2,2'-azobis-[2-methyl-N-(2-hydroxyethyl) propionamide], and others. Particularly preferable initiators include one which does not generate ionic residues after decomposition.

The obtained polyvinyl ester is converted into a corresponding polyvinyl alcohol in the saponification reaction in the presence of catalyst such as an alkali metal hydroxide (for example, potassium hydroxide and sodium hydroxide), alkali metal alkoxides (for example, sodium methoxide). The saponification catalyst can be added all at once at a beginning of the saponification reaction, alternatively can be added a portion thereof at a beginning of the saponification reaction and further added the rest of the catalyst during the saponification reaction. Examples of solvents to be used for the saponification reaction may include methanol, methyl acetate, dimethyl sulfoxide, diethyl sulfoxide, dimethyl formamide, and others. Methanol is preferred among these solvents. Saponification reaction can be carried out by either a batch process or a continuous process. After completion of saponification, if necessary, the remaining saponification catalyst may be neutralized by a neutralizing agent. Examples of neutralizing agents may include an organic acid, such as acetic acid and lactic acid, an ester compound such as methyl acetate, and others.

(Saponification Degree of Vinyl Alcohol Polymer)

The saponification degree of the vinyl alcohol polymer is not particularly limited to a specific one, and may be preferably in a range from 40 to 99.9 mol %. Saponification degree of less than 40 mol % may contribute to a reduced crystallinity of the polymer, and there is a possibility that the strength of the cation exchange membrane may be insufficient. The saponification degree may be more preferably 60 mol % or more, and still more preferably 80 mol % or more. The saponification degree is usually 99.9 mol % or less. Where the polyvinyl alcohol is a mixture of two or more polyvinyl alcohol species, the saponification degree refers to an average saponification degree of the mixture as a whole.

It should be noted that the saponification degree of the polyvinyl alcohol is a value measured according to JIS K6726.

(Polymerization Degree of Polyvinyl Alcohol)

The viscosity average polymerization degree (simply referred to as polymerization degree hereinafter) of the polyvinyl alcohol constituting the vinyl alcohol polymer segment is not particularly limited to a specific one, and may be preferably from 50 to 10,000. Polymerization degree of less than 50 may lead to a possibility that the cation exchange membrane cannot retain sufficient strength in practical use. Preferable polymerization degree may be 100 or more. In contrast, polymerization degree of over 10,000 may lead to an increased viscosity of an aqueous polymer solution being too high to perform coating or casting, resulting in a possibility to cause defects in the obtained membrane. Preferable polymerization degree may be 8,000 or less. Where the polyvinyl alcohol is a mixture of two or more polyvinyl alcohol species, the polymerization degree refers to an average polymerization degree of the mixture as a whole. It should be noted that the polymerization degree of the polyvinyl alcohol is a value measured according to JIS K6726. The polyvinyl alcohol without ionic group used in the present invention may also preferably have a polymerization degree in the above range.

(Content of Anionic Group-Containing Monomer Unit)

The content of anionic group-containing monomer units in the polyvinyl alcohol copolymer constituting the cation exchange membrane is not particularly limited to a specific one. The content of anionic group-containing monomer units in the copolymer, (i.e., the proportion of the number of anionic group-containing monomer units based on the total number of monomer units in the copolymer) is preferably 0.1 mol % or more. The content of the anionic group-containing monomer units of less than 0.1 mol % may lead to a possibility that a reduced effective charge density in the cation exchange membrane results in decreased selectivity for electrolyte permeation. Preferable content of the anionic group-containing monomer units is 0.5 mol % or more, and still more preferably 1 mol % or more. In contrast, the content of anionic group-containing monomer units is preferably 50 mol % or less. The content of the anionic group-containing monomer units of more than 50 mol % may lead to a possibility that the cation exchange membrane may have an increased swelling degree so as to decrease the effective charge density, resulting in decreased selectivity for electrolyte permeation. Preferable content of the anionic group-containing monomer units is 30 mol % or less, and still more preferably 20 mol % or less. Where the polyvinyl alcohol copolymer is a mixture of a polymer with an anionic group and a polymer without an anionic group, or a mixture of two or more anionic group-containing polymer species, the content of the anionic group-containing monomer units is given by a proportion of the number of anionic group-containing monomer units based on the total number of monomer units in the mixture.

(Method for Producing Cation Exchange Membrane)

The method for producing the cation exchange membrane according to the present invention is characterized in preparing as a main component a polyvinyl alcohol copolymer (preferably a block copolymer) comprising a vinyl alcohol polymer segment and an anionic group-containing polymer segment, and forming a membrane from the polyvinyl alcohol copolymer with a reduced content of salt contained in the copolymer so as to decrease the domain size of phase separation. The term "salt" used herein refers to sulfate salts and acetate salts included as impurities in polyvinyl alcohol constituting the vinyl alcohol polymer segment; and metal salts such as bromide salts, chloride salts, nitrate salts, phosphate salts and the like included as impurities in anionic group-containing monomers constituting the anionic polymer segment. Examples of salts may include NaCl, NaBr, KCl, KBr, $CaCl_2$, $ZnSO_4$, $Na_2CO_3$, $CH_3COONa$, $CH_3COOK$, $MgSO_4$, $CaSO_4$, and the like. These salts are inevitable impurities in polyvinyl alcohol copolymers. The inventors of the present invention have found that the impurities contributes to increased size of phase separation in micron scale of anionic polymer segment and others in the polyvinyl alcohol copolymer during film-formation process to adversely affect membrane properties. According to the present invention, film formation with a reduction of the amount of salts contained in the polyvinyl alcohol copolymer makes it possible to obtain a membrane having a reduced domain size in the phase separation. The proportion of the salt weight (C) relative to the polyvinyl alcohol copolymer weight (P) as represented by a weight ratio of (C)/(P) is required to be 4.5/95.5 or lower. In order to reduce the domain size, the weight ratio of (C)/(P) may be preferably 4.0/96.0 or lower, and more preferably 3.5/96.5 or lower. The weight ratio of (C)/(P) being more than 4.5/95.5 leads to an enlarged domain size in micron scale in the phase separation of anionic group polymer segment and others so that such a polymer causes change in ion permeation pathway in the polymer structure, resulting in failing to obtain a cation exchange membrane with durability.

The method for reducing the content of salts contained in the polyvinyl alcohol copolymer to a predetermined value or less is not particularly limited to a specific one. By way of example, impurities contained in the polyvinyl alcohol constituting the vinyl alcohol polymer segment can be reduced by washing polymer flakes with water.

Alternatively, impurities contained in a polymer constituting the anionic polymer segment can be reduced by dissolving the polymer in an appropriate solvent to obtain a polymer solution, and re-precipitating the polymer in a poor solvent of the polymer to be purified.

According to the present invention, it should be noted that the amount of salts can be reduced in either ways as described above. Accordingly, the amount of salts can be reduced to a predetermined amount by purification of polyvinyl alcohol polymer, or anionic polymer, or both.

(Membrane Forming)

The membrane with a predetermined thickness can be produced by dissolving a polyvinyl alcohol copolymer having an adjusted content of salt as described above in a solvent (for example, water; a lower alcohol such as methanol, ethanol, 1-propanol and 2-propanol; or a mixed solvent thereof), extruding or casting from a die to form a film-like material, and removing the solvent therefrom by devolatilization of the solvent. When the film is formed on plates or on rollers, the film-forming temperature is not limited to a specific one, and may be appropriately in a temperature range from room temperature to 100° C. in many cases. Solvent removal may be carried out by heating.

(Membrane Thickness)

The cation exchange membrane according to the present invention may preferably have a membrane thickness from 30 to 1,000 µm from the viewpoint of properties required for electrodialysis membrane, mechanical strength, handling properties and the like. The membrane with a thickness of less than 30 µm may have a tendency of insufficient mechanical strength. In contrast, the membrane with a thickness of more than 1,000 µm may have a higher membrane resistance so that the membrane may not express sufficient ion exchangeability and may have a tendency of less efficient electrodialysis. Preferable thickness may be in a range from 40 to 500 μm, and more preferably from 50 to 300 μm.

(Crosslinking Treatment)

In the method for producing the cation exchange membrane according to the present invention, after membrane (or film) formation, the obtained membrane is preferably subjected to crosslinking treatment. Crosslinking treatment can increase the mechanical strength of the cation exchange membrane. The way for crosslinking treatment is not limited to a specific one, and may be carried out by forming chemical bonds between polymer molecules via a chemical reaction, or by introducing interchain physical bonding by the application of heat.

The chemical bonding can be usually carried out by immersion of the obtained membrane (or film) in a solution containing a crosslinking agent. Examples of crosslinking agents may include an acetalizing agent for polyvinyl alcohol, such as glutaraldehyde, formaldehyde, glyoxal and the like. The concentration of the crosslinking agent based on the solution as volume concentration is usually 0.001 to 10% by volume. The crosslinking reaction can be carried out by treating a polyvinyl alcohol copolymer with the above-described aldehyde in water, an alcohol, or a mixture thereof, under acidic condition so as to introduce a chemical crosslinking bonding. After crosslinking reaction, washing treatment may be preferably carried out with water to remove unreacted aldehydes, acids and others.

Alternatively, as another method for crosslinking, physical interchain crosslinks can be introduced between the molecular chains by heat treatment. Heat treatment can generate physical crosslinking so as to increase mechanical strength of the ion exchange membrane to be obtained. The heat treatment method is not particularly limited to a specific one, and generally carried out by use of a hot air dryer, and others. The heat treatment temperature is not particularly limited to a specific one. As for polyvinyl alcohols, heat treatment may be preferably carried out from 50 to 250° C. The heat treatment temperature of lower than 50° C. may lead to a possibility that the mechanical strength of the ion exchange membrane obtained is insufficient. The heat treatment temperature may be preferably 80° C. or higher, and still more preferably 100° C. or higher. When heat treatment temperature exceeds 250° C., there is a possibility that the crystalline polymer is melted. The heat treatment temperature may be preferably 230° C. or lower, and still more preferably 200° C. or lower.

The production method may comprise both heat treatment and chemical crosslinking, or either only one of them. Where carrying out both chemical crosslinking treatment and heat treatment, (i) the crosslinking treatment may be conducted after the heat treatment, (ii) the heat treatment may be conducted after the crosslinking treatment, or (iii) the crosslinking treatment and the heat treatment may be conducted at the same time. From the viewpoint of the mechanical strength of the ion exchange membrane obtained, the crosslinking treatment may be conducted after the heat treatment.

(Ion Exchange Capacity)

In order to exhibit sufficient ion exchange properties as a cation exchange membrane for electrodialysis, the obtained polyvinyl alcohol copolymer preferably has an ion exchange capacity of 0.30 meq/g or higher, and more preferably 0.50 meq/g or higher. The upper limit of the ion exchange capacity of the polyvinyl alcohol copolymer may be preferably 3.0 meq/g or lower because too large ion exchange capacity may increase hydrophilic property leading to difficulty in swelling suppression.

(Charge Density)

In order to exhibit sufficient electrical properties as a cation exchange membrane for electrodialysis, the obtained cation exchange membrane preferably has a charge density of 0.6 mol/dm$^3$ or higher, and more preferably 1.0 mol/dm$^3$ or higher. Although the cation exchange membrane preferably has higher charge density, in view of balance between charge density and membrane resistance, cation exchange membranes exhibiting a desired charge density while maintaining relatively low membrane resistance are preferred.

If necessary, the cation exchange membrane according to the present invention can be used in a reinforced form laminated with a support such as a nonwoven fabric, a woven fabric, or a porous material.

(Applications)

The cation exchange membrane according to the present invention can be used in various applications. Since the exchange membrane according to the present invention is excellent in organic fouling resistance, has reduced membrane resistance, and is capable of conducting stable electrodialysis efficiently for a long period of time, the cation exchange membrane is suitably used for desalination of organic materials (for example, food, sauce, seasoning liquid of pickled ume, pharmaceutical raw materials), tartrate stabilization in wine, adjustment of mineral contents in milk, desalination of whey, removal of harmful ions (nitrate nitrogen, or fluorine) from ground water, desalination of leachate, concentration of salts from seawater, desalination of molasses, desalination of seawater or underground brine or brackish water, desalination of tap water, desalination of organic wastewater, desalination of deep sea water, recovery of lithium salt from lithium ion-containing water, softening of water, and others.

EXAMPLES

In the following, although the present invention will be described in more detail by means of Examples, the present invention is not limited to these Examples in any way. In the Examples, "%" and "parts" are indicated as by weight unless otherwise specified.

The properties of the cation exchange membranes shown in Examples and Comparative Examples were measured in the following method.

(1) Water Content (H) of Membrane

Dry weight of an ion exchange membrane was measured in advance, followed by making the membrane immersed in deionized water. After the membrane reached to swelling equilibrium, wet weight of the membrane was measured. The water content (H) of the membrane was calculated by the following formula:

$$H=\{(Ww-Dw)/1.0\}/\{(Ww-Dw)/1.0+(Dw/1.3)\}$$

In the formula, 1.0 and 1.3 show specific gravities of water and polymer, respectively.

H: Water content of membrane [−]
Dw: Dry weight of membrane [g]
Ww: Wet weight of membrane [g]

(2) Measurement of Cation Exchange Capacity

A cation exchange membrane was immersed in an aqueous solution of HCl (1 mol/L) for 10 hours or longer. Thereafter, hydrogen ions in the cation exchange membrane were substituted with sodium ions with an aqueous solution of NaNO$_3$ (1 mol/L). The amount of the released hydrogen ions was determined by use of acid-base titration (A: mol).

Next, the same type of cation exchange membrane as above was immersed in an aqueous solution of NaCl (1 mol/L) for 4 hours or longer, followed by being thoroughly washed with deionized water. Thereafter, the membrane was dried at 105° C. in a hot air drier for 8 hours to measure the dry weight of the membrane (W: g).

The ion exchange capacity was calculated by the following formula:

Ion exchange capacity=$A \times 1000/W$ [mmol/g-dry membrane]

(3) Measurement of Salt in Polyvinyl Alcohol Copolymer

A membrane of polyvinyl alcohol copolymer prior to be subjected to crosslinking was subjected to measure the content of salts in the polyvinyl alcohol copolymer by carrying out using Soxhlet extractor with methanol to obtain an extracted liquid, followed by drying the liquid to measure the amount of salts in the extract by ion chromatography (DIONEX ICS-5000).

(4) Measurement of Membrane Resistance

Figure 1A:
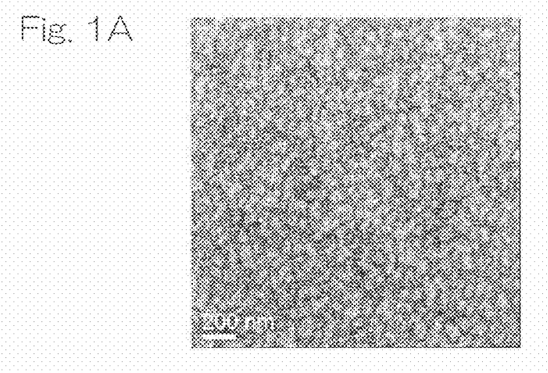
FIG. 1A is a TEM photograph of an ion exchange membrane prepared in Example 5 according to one embodiment of the present invention.
Figure 1B:
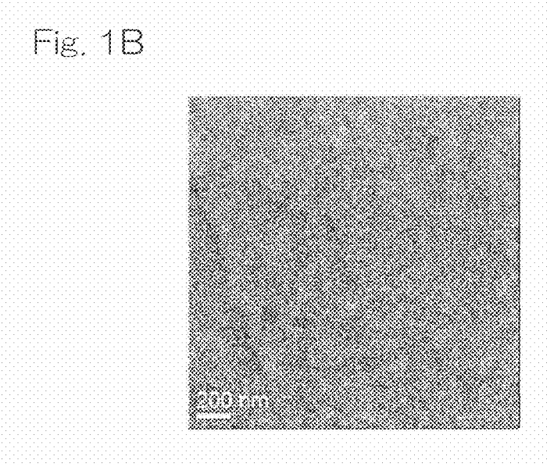
FIG. 1B is a TEM photograph of an ion exchange membrane prepared in Example 7 according to one embodiment of the present invention.
Figure 1C:
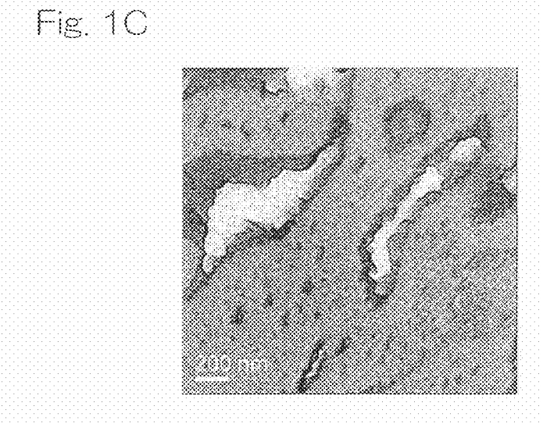
FIG. 1C is a TEM photograph of an ion exchange membrane prepared in Comparative Example 1.
Figure 1D:
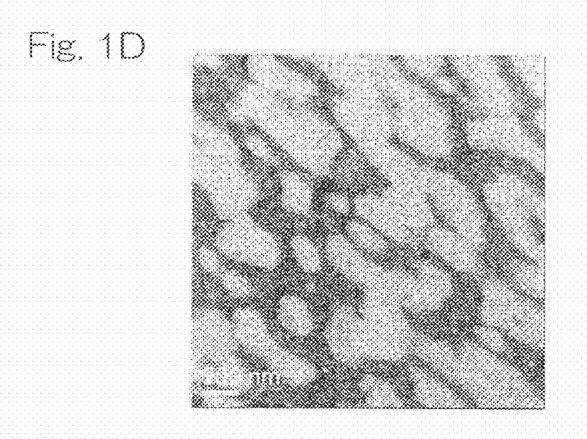
FIG. 1D is a TEM photograph of an ion exchange membrane prepared in Comparative Example 2.
Figure 1E:
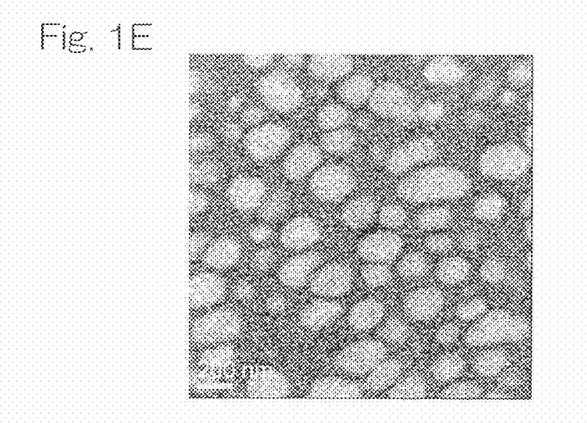
FIG. 1E is a TEM photograph of an ion exchange membrane prepared in Comparative Example 3.
Figure 2:
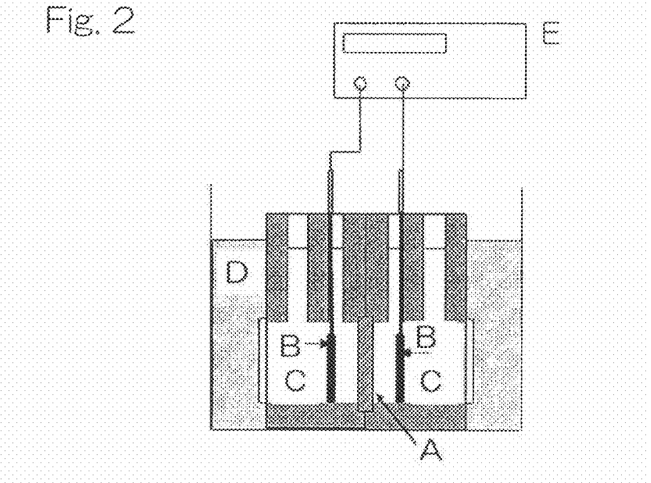
FIG. 2 is a schematic cross-sectional view for illustrating an apparatus used to measure membrane resistance of cation exchange membranes according to the present invention.

Electrical resistance of membrane (membrane resistance) was determined using a cell having two compartments each comprising a platinum black electrode plate as shown in FIG. 2. A cation exchange membrane was interposed between the compartments. Subsequently a NaCl solution (0.5 mol/L) was filled into the two compartments. Resistance between the electrodes were measured at 25° C. with operating AC bridge (frequency: 10 cycles/sec) under each condition with or without the cation exchange membrane. Difference in resistance under the conditions between with and without the cation exchange membrane was calculated. It should be noted that the membrane used in the above measurement was conditioned in a NaCl solution (0.5 mol/L) in advance so as to be reached in equilibrium.

(5) Measurement of Domain Size

A measurement sample was prepared by cutting a cation exchange membrane, which was immersed in distilled water in advance, into a shape of 1 cm square. After dying the measurement sample with lead acetate (II), the dyed sample was observed using TEM (transmission electron microscope) to obtain an image of particles in the measurement sample. The obtained image was processed using an image processing software "WINROOF" produced by Mitani Corporation to obtain a maximum particle diameter with respect to each particle. After counting maximum particle diameters for approximately 400 particles, the particle diameter of the particle at a cumulative frequency of 50% is defined as a domain size of the anionic group-containing polymer segment of the cation exchange membrane.

(6) Measurement of Conductivity

The conductivity of an electrodialysis-treated liquid was measured and calculated using an electric conductivity meter (ES-51 produced by HORIBA, Ltd.)

(7) Measurement of Sugar Content

The amount of sugar was measured and calculated using a high performance liquid chromatograph (LC-10A produced by Shimadzu Corporation).

(8) Evaluation of Organic Fouling

Membrane resistance increases during electrodialysis when organic fouling occurs. The membrane having a lower increase in membrane resistance can be evaluated to have higher resistance against organic fouling. Accordingly, increase rate of membrane resistance at one hour after starting energization was used for determining fouling propensities of a membrane.

[Production of PVA-1 (Polyvinyl Alcohol Copolymer Having a Mercapto Group at its Terminal]

By the method described in JP Laid-open Patent Publication No. 59-187003, was synthesized a polyvinyl alcohol copolymer having a mercapto group at its terminal (PVA-1) as shown Table 1. Table 1 also shows polymerization degree and saponification degree of PVA-1.

TABLE 1

| | Polymerization degree | Saponification degree (mol %) | Molecular terminal group |
|---|---|---|---|
| PVA-1 | 1500 | 98.5 | Mercapto group |

[Preparation of NaSS-1 (Anionic Monomer)]

Sodium p-styrenesulfonate monomer (NaSS produced by TOSOH CORPORATION) shown in Table 2 was used without any treatment. The salt content in the monomer was measured by ion chromatography (DIONEX ICS-5000). It should be noted that the impurity amount other than salt amount in Table 2 was water in the monomers.

[Preparation of NaSS-2]

Into 950 g of pure water, were put 1,000 g of sodium p-styrenesulfonate monomer (NaSS produced by TOSOH CORPORATION), 40 g of sodium hydroxide, and 1 g of sodium nitrate to be dissolved at 60° C. for 1 hour. The solution was subjected to recrystallization by cooling to 20° C. Thereafter, crystals of p-styrenesulfonate monomers were separated by centrifugal filtration, and dried to obtain NaSS-2 (purified p-styrenesulfonate monomer) shown in Table 2. The salt content in the monomer was measured by ion chromatography (DIONEX ICS-5000).

TABLE 2

| | | NaBr (%) | NaOH (%) | NaSO$_4$ (%) | NaCl (%) | Total Salt (%) | Water (%) | Monomer Purity (%) |
|---|---|---|---|---|---|---|---|---|
| Nass-1 | Unpurified | 2.1 | 0.07 | 0.6 | 0.06 | 2.83 | 9.2 | 88 |
| Nass-2 | Purified | 0.3 | 0.2 | 0.1 | 0.002 | 0.602 | 9.4 | 90 |

[Synthesis of P-1 (Anionic Block Copolymer)]

Into a four-necked separable flask (1 L) equipped with a reflux condenser and a stirring blade, were put 660 g of water, 80 g of PVA-1 shown in Table 1 as the vinyl alcohol polymer having a mercapto group at its terminal, and 46.6 g of NaSS-1, followed by heating the mixture with stirring to 95° C. so as for the vinyl alcohol polymer and the NaSS-1 to be dissolved in water. Further, nitrogen gas was bubbled into the aqueous solution for 30 minutes so as to replace the reaction system with nitrogen. After replacing with nitrogen, the aqueous solution was cooled to 90° C., and then 5.4% of 2,2'-azobis-[2-methyl-N-(2-hydroxyethyl) propionamide] (13 mL) was successively added to the solution for 1.5 hours to initiate and proceed block copolymerization, followed by further polymerization for 1 hour with maintaining the inside temperature at 90° C. Subsequently, the resultant was cooled to obtain an aqueous solution of PVA-(b)-sodium p-styrenesulfonate (solid content concentration: 15%). A part of the resulting aqueous solution was dried and then dissolved in heavy water to be subjected to $^1$H-NMR measurement at 400 MHz. As a result, the obtained block copolymer had a modification amount with sodium p-styrenesulfonate units of 10 mol %. Table 3 shows the properties of the obtained anionic block copolymer.

[Synthesis of P-2]

Except for using NaSS-2 as the anionic monomer instead of NaSS-1, an aqueous solution of PVA-(b)-sodium p-styrenesulfonate (solid content concentration: 15%) was obtained in the same manner as P-1. Table 3 shows the properties of the obtained anionic block copolymer.

[Synthesis of P-3]

Into a four-necked separable flask (1 L) equipped with a reflux condenser and a stirring blade, were put 616 g of water, 80 g of PVA-1 shown in Table 1 as the vinyl alcohol polymer having a mercapto group at its terminal, and 46.6 g of NaSS-1, followed by heating the mixture with stirring to 95° C. so as for the vinyl alcohol polymer and the NaSS-1 to be dissolved in water, and then cooling the solution to a room temperature. The solution was adjusted to have a pH value of 3.0 by adding sulfuric acid (½ N) into the solution. The aqueous solution was heated to 90° C., followed by bubbling nitrogen into the solution for 30 minutes so as to replace the reaction system with nitrogen. After replacing, 2.5% of sodium persulfate (63 mL) was successively added to the solution for 1.5 hours to initiate and proceed block copolymerization, followed by further polymerization for 1 hour with maintaining the inside temperature at 90° C. Subsequently, the resultant was cooled to obtain an aqueous solution of PVA-(b)-sodium p-styrenesulfonate (solid content concentration: 15%). A part of the resulting aqueous solution was dried and then dissolved in heavy water to be subjected to $^1$H-NMR measurement at 400 MHz. As a result, the obtained block copolymer had a modification amount with sodium p-styrenesulfonate units of 10 mol %. Table 3 shows the properties of the obtained anionic block copolymer.

[Synthesis of P-4]

Except for using NaSS-2 as the anionic monomer instead of NaSS-1, an aqueous solution of PVA-(b)-sodium p-styrenesulfonate (solid content concentration: 15%) was obtained in the same manner as P-3. Table 3 shows the properties of the obtained anionic block copolymer.

[Synthesis of P-5]

Except for using NaSS-2 as the anionic monomer instead of NaSS-1 in the formulation shown in Table 3, an aqueous solution of PVA-(b)-sodium p-styrenesulfonate (solid content concentration: 15%) was obtained in the same manner as P-1. Table 3 shows the properties of the obtained anionic block copolymer.

[Synthesis of P-6]

Into a four-necked separable flask (6 L) equipped with a stirrer, a temperature sensor, a dropping funnel and a reflux condenser, were put 2,450 g of vinyl acetate, 762 g of methanol, and 27 g of 2-acrylamido-2-methylpropanesulfonic acid sodium salt (AMPS), and then the reaction system was replaced with nitrogen with stirring, followed by increasing internal temperature to 60° C. Into the reaction system, was added 20 g of methanol containing 0.8 g of 2,2'-azobisisobutyronitrile (AIBN) to initiate polymerization reaction. From the starting point of the polymerization reaction, 567 g of a methanol solution containing 25 mass % of 2-acrylamido-2-methylpropanesulfonic acid sodium salt (AMPS) was successively added into the reaction system to carry out polymerization reaction for 4 hours, and then the polymerization reaction was stopped. The solid content concentration in the reaction system at the time of stopping the reaction, i.e., the proportion of the solid matters in the entire polymerization reaction slurry was 30 mass %. Thereafter, by introducing methanol vapor into the reaction system, unreacted vinyl acetate monomers were purged to obtain a methanol solution containing 30 mass % of vinyl ester copolymer.

Into the methanol solution containing 30 mass % of vinyl ester copolymer, were added methanol and a methanol solution containing 10 mass % of sodium hydroxide in this order with stirring until the solution had a molar ratio of sodium hydroxide relative to vinyl ester units in the copolymer of 0.02 and a solid content concentration of the vinyl acetate copolymer was 30 mass %. Thereafter saponification reaction was initiated at 40° C.

Immediately after gel formation along with the progress of saponification reaction, the gel was taken out from the reaction system and crushed. Subsequently, one hour after gel formation, was added methyl acetate to the crushed material to carry out neutralization so as to obtain an aqueous solution of a random copolymer of polyvinyl alcohol/poly(2-acrylamido-2-methylpropanesulfonic acid sodium salt) in a swollen state. Into the swollen anionic polymer, was added methanol in an amount of 6 times on mass basis (bath ratio of 6 times), followed by washing the resultant for 1 hour under reflux to collect a polymer by filtration. The polymer was dried for 16 hours at 65° C. Thus obtained polymer was dissolved in heavy water to be subjected to $^1$H-NMR measurement at 400 MHz. As a result, the obtained block copolymer had a ratio of 2-acrylamido-2-methylpropanesulfonic acid sodium salt monomer units based on the total monomer units in the polymer of 5 mol %. Table 4 shows the properties of the obtained anionic random copolymer.

TABLE 3

| | PVA polymer | Anionic group-containing monomer | | | Initiator | | Polymerization | Solid | Block polymer |
| | Fed amount (g) | Species | Fed amount (g) | Water (g) | Species | Conc. (wt %) | Amount (mL) | time (hr.) | conc. (wt %) | Modified amount (mol %) |
|---|---|---|---|---|---|---|---|---|---|---|
| P-1 | 80 | NaSS-1 | 46.6 | 660 | Azo type | 5.4 | 13 | 1.5 | 15 | 10 |
| P-2 | 80 | NaSS-2 | 45.5 | 655 | Azo type | 5.4 | 13 | 1.5 | 15 | 10 |
| P-3 | 80 | NaSS-1 | 46.6 | 616 | KPS | 2.5 | 63 | 1.5 | 15 | 10 |

TABLE 3-continued

| | Polymerization condition | | | | | | | | Block polymer |
|---|---|---|---|---|---|---|---|---|---|
| PVA polymer | Anionic group-containing monomer | | | Initiator | | | Polymerization | Solid | Modified |
| Fed amount (g) | Species | Fed amount (g) | Water (g) | Species | Conc. (wt %) | Amount (mL) | time (hr.) | conc. (wt %) | amount (mol %) |
| P-4  80 | NaSS-2 | 45.5 | 610 | KPS | 2.5 | 63 | 1.5 | 15 | 10 |
| P-5  80 | NaSS-2 | 21.4 | 465 | Azo type | 5.4 | 6.2 | 1.5 | 15 | 5 |

TABLE 4

| | Polymerization condition | | | | | | | Saponification condition | | Anionic polymer | | |
|---|---|---|---|---|---|---|---|---|---|---|---|---|
| | | | | | MeOH | | | | | | | |
| | Ionic group-containing monomer | | | | Initial fed amount (g) | Initiator AIBN (g) | Time (h) | Solid conc. (mass %) | Saponification conc. (mass %) | Saponification degree (mol %) | Polymerization degree | Anionic polymer content (mol %) |
| Vinyl acetate (g) | Species | Initial fed amount (g) | Successive fed amount (g) | Successive fed conc. (%) | | | | | | NaOH Molar ratio | | |
| P-6  2450 | AMPS | 27 | 567 | 25 | 762 | 0.8 | 4 | 30 | 30 | 0.02 | 98.5 | 1700 | 5 |

AMPS: 2-acrylamido-2-methylpropanesulfonic acid sodium salt

Example 1

Preparation of Ion Exchange Membrane

After diluting the P-3 polymer to a concentration of 10 wt %, re-precipitation was carried out with the same volume of methanol as the diluted solution so as to collect a polymer from which salts were removed. Thereafter a required volume of water was added to the polymer to prepare an aqueous solution (15 wt %) containing the polymer. The solution was casted onto an acrylic cast plate (vertical: 270 mm, horizontal: 210 mm). After removing excess liquid and bubbles, the casted liquid was dried for 24 hours on a hot plate at 50° C. to produce a film.

Thus obtained film was heat-treated for 30 minutes at 160° C. to form physical crosslinks. Then, the film was immersed in an aqueous electrolyte solution of sodium sulfate (2 mol/L) for 24 hours. After adding concentrated sulfuric acid into the aqueous electrolyte solution until the solution had a pH of 1, the film was immersed in a 1.0 vol % of glutaraldehyde aqueous solution, and crosslinking treatment was carried out at 25° C. with stirring for 24 hours. Herein, as the glutaraldehyde aqueous solution, was used a water-diluted solution of "glutaraldehyde" (25 vol %) produced by Ishizu Chemicals Co. After the crosslinking treatment, the film was immersed in deionized water. With exchanging the deionized water several times, the film was immersed therein until reaching to swelling equilibrium so as to obtain a cation exchange membrane.

(Evaluation of Ion Exchange Membrane)

The cation exchange membrane produced in this manner was cut into a desired size to obtain a measurement sample. With thus obtained sample, measurements were carried out for membrane water content, charge density, cation exchange capacity, membrane resistance, and phase separation size. Table 5 shows the obtained results.

Example 2

After diluting the P-3 polymer to a concentration of 10 wt %, re-precipitation was carried out with 2 times the volume of methanol to the diluted solution so as to collect a polymer from which salts were removed. Thereafter a required volume of water was added to the polymer to prepare an aqueous solution (15 wt %) containing the polymer. The solution was casted onto an acrylic cast plate (vertical: 270 mm, horizontal: 210 mm). After removing excess liquid and bubbles, the casted liquid was dried for 24 hours on a hot plate at 50° C. to produce a film. Except for the above procedure, a cation exchange membrane was produced in the same way as Example 1 to measure membrane properties. Table 5 shows the obtained results.

Example 3

An aqueous solution of P-2 was casted onto an acrylic cast plate (vertical: 270 mm, horizontal: 210 mm). After removing excess liquid and bubbles, the casted liquid was dried for 24 hours on a hot plate at 50° C. to produce a film. Except for the above procedure, a cation exchange membrane was produced in the same way as Example 1 to measure membrane properties. Table 5 shows the obtained results.

Example 4

Except for changing the heat treatment temperature in Example 3 into the temperature shown in Table 5, a cation exchange membrane was produced in the same way as Example 3 to measure membrane properties. Table 5 shows the obtained results.

Example 5

After diluting the P-3 polymer to a concentration of 10 wt %, re-precipitation was carried out with 5 times the volume of methanol to the diluted solution so as to collect a polymer from which salts were removed. Thereafter a required volume of water was added to the polymer to prepare an aqueous solution (15 wt %) containing the polymer. The solution was casted onto an acrylic cast plate (vertical: 270 mm, horizontal: 210 mm). After removing excess liquid and bubbles, the casted liquid was dried for 24 hours on a hot plate at 50° C. to produce a film. Except for the above procedure, a cation exchange membrane was produced in the same way as Example 1 to measure membrane properties. Table 5 shows the obtained results.

Example 6

After diluting the P-3 polymer to a concentration of 10 wt %, re-precipitation was carried out with 10 times the volume of methanol to the diluted solution so as to collect a polymer from which salts were removed. Thereafter a required volume of water was added to the polymer to prepare an aqueous solution (15 wt %) containing the polymer. The solution was casted onto an acrylic cast plate (vertical: 270 mm, horizontal: 210 mm). After removing excess liquid and bubbles, the casted liquid was dried for 24 hours on a hot plate at 50° C. to produce a film. Except for the above procedure, a cation exchange membrane was produced in the same way as Example 1 to measure membrane properties. Table 5 shows the obtained results.

Example 7

Except for changing the cation exchange polymer in Example 1 into a cation exchange polymer shown in Table 5, a cation exchange membrane was produced in the same way as Example 1 to measure membrane properties. Table 5 shows the obtained results.

Comparative Examples 1 to 4

Except for changing the cation exchange polymer in Example 1 into each of cation exchange polymers shown in Table 5, cation exchange membranes of Comparative Examples 1 to 4 were produced in the same way as Example 1 to measure membrane properties. Table 5 shows the obtained results.

FIGS. 1A, 1B, 1C, 1D and 1E show TEM photographs of cation exchange membranes using block copolymers having different salt contents, respectively (see Table 5 for salt contents). The TEM photographs of FIGS. 1A, 1B, 1C, 1D and 1E reveal that the phase separation structures are changed depending on salt contents, and that the decreased ratio of (C)/(P) (C: salt content by weight, P: block copolymer weight) contributes to smaller domain size. In particular, Example 7 (FIG. 1B) with a modification amount of 10 mol % and having the smallest salt content has improved compatibility so as to have a very small domain size of 4 nm. On the other hand, Comparative Example 1 (FIG. 1C) having the largest salt content has strong phase separation to cause voids in the membrane.

The results of Table 5 reveal that the membranes obtained from the block copolymers (P) each having a salt content of 4.5% or less have domain sizes of 150 nm or smaller. Such membranes are excellent as a cation exchange membrane because they have high charge densities and low membrane resistances, respectively (Examples 1 to 7). Further, the membranes obtained from the block copolymers (P) each having a salt content of 4.0% or less have domain sizes of 130 nm or smaller. Such membranes have charge densities of not lower than 1.0 mol/dm$^3$ and low membrane resistances, respectively (Examples 2 to 7). On the other hand, the membranes having domain sires of larger than 150 nm had low charge densities and high membrane resistances, respectively, resulting in failing to exhibit properties of cation exchange membrane (Comparative Examples 1 to 3). In particular, the membrane having the large salt content has strong phase separation of polymer segments from each other to cause voids throughout the entire membrane, resulting in unsatisfactory properties as ion exchange membrane (Comparative Example 1). It should be noted that although Comparative Example 2 uses the purified NaSS-2, since KPS is used as a polymerization initiator, the obtained cation exchange polymer has the high salt content.

On the other hand, the membrane (Comparative Example 4) obtained from the random copolymer (P-6), which is considered to be completely miscible, does not exhibit microphase separation and has higher membrane resistance than the membrane (Example 5) obtained from the block copolymer P-5 having a small domain size as shown in Table 5. Therefore, there results confirm that important features for excellent membrane performance is to produce a membrane from a block copolymer in which the phase separation domains are present and a domain size (X) in the phase separation is over 0, i.e., X>0.

TABLE 5

| | Cation exchange membrane (CEM) | | | | | Properties of CEM | | | | | | |
|---|---|---|---|---|---|---|---|---|---|---|---|---|
| | Polymer (P) | Salt content (C) (wt %) | C/P | Heat treatment Temp. (°C) | Crosslinking condition Crosslinking agent | Crosslinking condition Conc. (vol %) | Thickness (μm) | Water content (H) (%) | Charge density (mol/dm$^3$) | Ion change capacity (mmol/g) | Membrane resistance (Ω-cm$^2$) | Domain size (nm) | CEM |
| Ex. 1 | P-3 | 4.5 | 4.5/95.5 | 160 | GA | 1.0 | 80 | 33.5 | 1.2 | 1.4 | 10 | 144 | CEM-1 |
| Ex. 2 | P-3 | 4.0 | 4.0/96.0 | 160 | GA | 1.0 | 80 | 33.4 | 1.3 | 1.3 | 6 | 120 | CEM-2 |
| Ex. 3 | P-2 | 2.8 | 2.8/97.2 | 160 | GA | 1.0 | 80 | 33.0 | 1.4 | 1.4 | 2.3 | 82 | CEM-3 |
| Ex. 4 | P-2 | 2.8 | 2.8/97.2 | 180 | GA | 1.0 | 80 | 32.4 | 1.5 | 1.4 | 1.5 | 58 | CEM-4 |
| Ex. 5 | P-3 | 2.0 | 2.0/98.0 | 160 | GA | 1.0 | 80 | 32.3 | 1.6 | 1.3 | 1.1 | 32 | CEM-5 |
| Ex. 6 | P-3 | 1.5 | 1.5/98.5 | 160 | GA | 1.0 | 80 | 31.9 | 1.7 | 1.3 | 0.9 | 10 | CEM-6 |
| Ex. 7 | P-5 | 1.0 | 1.0/99.0 | 160 | GA | 1.0 | 80 | 28.3 | 1.8 | 0.7 | 3.3 | 4 | CEM-7 |
| Com. Ex. 1 | P-3 | 6.1 | 6.1/93.9 | 160 | GA | 1.0 | 80 | 39.4 | 0.6 | 0.5 | 252 | *1 | CEM-8 |
| Com. Ex. 2 | P-4 | 5.2 | 5.2/94.8 | 160 | GA | 1.0 | 80 | 36.6 | 0.8 | 0.9 | 32 | *2 | CEM-9 |
| Com. Ex. 3 | P-1 | — | — | 160 | GA | 1.0 | 80 | 34.7 | 1.0 | 1.4 | 18 | 180 | CEM-10 |
| Com. Ex. 4 | P-6 | <1 | <1/>99.9 | 160 | GA | 1.0 | 80 | 25.2 | 1.5 | 0.9 | 11 | *3 | CEM-11 |

*1: Strong phase separation caused continuous sea-island structure, resulting in elution of a part of the constituents. Domain size was undeterminable.
*2: Strong phase separation caused continuous sea-island structure. Domain size was undeterminable.
*3: Phase separation was not observed.

Example 8

Desalination test of molasses (sugar solution) was carried out by using the polyvinyl alcohol copolymer membrane (CEM-1) obtained in Example 1 as the cation exchange membrane and a membrane named AMX produced by ASTOM Corporation as the anion exchange membrane in a small-type electric dialyzer named Acilyzer S3 produced by ASTOM Corporation in which both membranes were alternately arranged and tightened between a cathode and an anode as electrodes. On performing the test, the membranes were conditioned before usage by allowing them to be immersed in saline (0.25 mol/L) for 1 hour. The sample molasses used as a dilute was prepared by dissolving a commercially available waste molasses (refined molasses for agricultural purpose (waste molasses produced by Sunjet-eye Corporation) in ion exchanged water so as to have a solid content concentration of 45%, and then adjusted to have a pH of 7.0. Desalination of molasses was conducted by a batch method in which the charged volume of the molasses solution per batch was 8 L at a dialysis temperature of 50° C.±2° C. Electrodialysis was carried out at a fixed current of 0.1 A/cm$^2$ for 1 hour by using a saline solution of 0.25 mol/L as the concentrate. In the process, change in membrane resistance of the cation exchange membrane before and after electrodialysis was measured. Membrane resistance increased when the fouling of the membrane was caused during energization. When increase in membrane resistance is small, the membrane can be determined to have stronger resistance against organic fouling substances. Accordingly, increase rate of membrane resistance at one hour after starting energization was used for evaluating organic fouling of membranes.

Examples 9 to 14

Except for using each of the polyvinyl alcohol copolymer membranes (CEM-2 to CEM-7) obtained in the Examples 2 to 7 instead of the cation exchange membrane used in Example 8, the desalination test of the sugar solution was carried out in the same manner as in Example 8. Table 6 shows the obtained results.

Comparative Examples 5 to 8

Except for using each of the polyvinyl alcohol copolymer membranes (CEM-8 to CEM-11) obtained in the Comparative Examples 1 to 4 instead of the cation exchange membrane used in Example 8, the desalination test of the sugar solution was carried out in the same manner as in Example 8. Table 6 shows the obtained results.

Comparative Example 9

Except for using a membrane named CMX produced by ASTOM Corporation instead of the cation exchange membrane used in Example 8, the desalination test of the sugar solution was carried out in the same manner as in Example 8. Table 6 shows the obtained results.

The results in Table 6 reveal that electrodialysis using the cation exchange membranes having domain sizes of 150 nm or smaller in microphase separation achieves low sugar leakage rates and small increase rates in membrane resistance (reduced fouling on membranes) (Examples 8 to 14). On the other hand, electrodialysis using the cation exchange membranes having domain sizes of larger than 150 nm as phase separation showed high sugar leakage rates as well as low desalination rates (Comparative Examples 5 to 7). In contrast, in the cation exchange membrane CEM-11 (Comparative Example 8) obtained from the random copolymer which was considered to be completely miscible and did not exhibit microphase separation, the desalination rate was comparable to Examples but deteriorated in resistance to organic fouling. When commercially available cation exchange membranes were used in Comparative Example 9, voltage rising rate was significantly high because of organic fouling, resulting in early cessation of electrodialysis at 30 minutes after starting energization. Accordingly, in sugar leakage rate, desalination rate and increase in membrane resistance were measured at the time of cessation (Comparative Example 9). From the above results, the ion exchange membranes each comprising a vinyl alcohol copolymer with small phase separation of the polymer segments have excellent properties as the ion exchange membrane, as well as contribute to excellent sugar leakage rate and resistance in organic fouling.

TABLE 6

| | Cation exchange membrane | Anion exchange membrane | Desalting liquid conductivity (ms/cm) | | Desalination rate (%) | Sugar amount (g) | Sugar leakage rate (% based on molasses) | CEM organic fouling (%) |
|---|---|---|---|---|---|---|---|---|
| Ex. 8 | CEM-1 | AMX | Start | 15.2 | 78 | 1384 | 0.10 | 60.0 |
| | | | End | 3.3 | | 1383 | | |
| Ex. 9 | CEM-2 | AMX | Start | 15.2 | 79 | 1384 | 0.11 | 53.3 |
| | | | End | 3.2 | | 1382 | | |
| Ex. 10 | CEM-3 | AMX | Start | 15.2 | 79 | 1384 | 0.11 | 50.0 |
| | | | End | 3.2 | | 1382 | | |
| Ex. 11 | CEM-4 | AMX | Start | 15.2 | 79 | 1384 | 0.11 | 46.7 |
| | | | End | 3.2 | | 1382 | | |
| Ex. 12 | CEM-5 | AMX | Start | 15.2 | 79 | 1384 | 0.10 | 40.0 |
| | | | End | 3.2 | | 1383 | | |
| Ex. 13 | CEM-6 | AMX | Start | 15.2 | 79 | 1384 | 0.10 | 33.3 |
| | | | End | 3.2 | | 1383 | | |
| Ex. 14 | CEM-7 | AMX | Start | 15.2 | 82 | 1384 | 0.09 | 33.3 |
| | | | End | 2.7 | | 1383 | | |
| Com. Ex. 5 | CEM-8 | AMX | Start | 15.2 | 70 | 1384 | 0.15 | 83.8 |
| | | | End | 4.6 | | 1382 | | |
| Com. Ex. 6 | CEM-9 | AMX | Start | 15.2 | 70 | 1384 | 0.14 | 76.7 |
| | | | End | 4.5 | | 1382 | | |

TABLE 6-continued

|  | Cation exchange membrane | Anion exchange membrane | | Desalting liquid conductivity (ms/cm) | Desalination rate (%) | Sugar amount (g) | Sugar leakage rate (% based on molasses) | CEM organic fouling (%) |
|---|---|---|---|---|---|---|---|---|
| Com. Ex. 7 | CEM-10 | AMX | Start | 15.2 | 72 | 1384 | 0.13 | 73.3 |
|  |  |  | End | 4.2 |  | 1383 |  |  |
| Com. Ex. 8 | CEM-11 | AMX | Start | 15.2 | 79 | 1384 | 0.13 | 65.0 |
|  |  |  | End | 3.2 |  | 1382 |  |  |
| Com. Ex. 9*[1] | CMX[1)] | AMX[2)] | Start | 15.2 | 32 | 1384 | 0.07 | 6566.7 |
|  |  |  | End | 10.3 |  | 1383 |  |  |

[1)]Commercially available CEM produced by ASTOM Co., Ltd,
[2)]Commercially available AEM produced by ASTOM Co., Ltd
*[1]Measurement result on cessation of desalination during 30 minutes

INDUSTRIAL APPLICABILITY

According to the present invention, the cation exchange membrane comprising a polyvinyl alcohol copolymer having an anionic polymer segment and a vinyl alcohol polymer segment has excellent charge density and membrane resistance, as well as being excellent in durability because of suppression of phase separation in micron scale. Such a cation exchange membrane is expected to be used for applications for such as electrodialysis.

Preferred embodiments according to the present invention are shown and described. It is to be understood that various changes, modifications and omissions may be made without departing from the spirit according to the present invention and are encompassed in the scope of the claims.

DESCRIPTION OF REFERENCE NUMERALS

A: ion exchange membrane
B: platinum electrode
C: NaCl aqueous solution
D: water bath
E: LCR meter

What is claimed is:

1. A cation exchange membrane, comprising a polyvinyl alcohol copolymer, wherein:
   the polyvinyl alcohol copolymer comprises an anionic group-containing anionic polymer segment and a vinyl alcohol polymer segment; the content of the anionic group-containing monomer units is in the range of 0.1 to 50 mol % based on the total number of monomer units in the polyvinyl alcohol copolymer; and
   the polyvinyl alcohol copolymer has a microphase separation structure having a domain size (X) satisfying 0 nm<X≤150 nm.

2. The cation exchange membrane as claimed in claim 1, further comprising a polyvinyl alcohol homopolymer or copolymer without an anionic group.

3. The cation exchange membrane as claimed in claim 2, consisting essentially of the polyvinyl alcohol copolymer and the polyvinyl alcohol homopolymer or copolymer without an anionic group.

4. The cation exchange membrane as claimed in claim 1, wherein the polyvinyl alcohol copolymer has a crosslinking structure introduced thereinto.

5. The cation exchange membrane as claimed in claim 1, wherein the polyvinyl alcohol copolymer is an anionic block copolymer comprising a vinyl alcohol polymer block and an anionic group-containing anionic polymer block.

6. The cation exchange membrane as claimed in claim 1, wherein the polyvinyl alcohol copolymer is an anionic graft copolymer comprising a vinyl alcohol polymer block and an anionic group-containing anionic polymer block.

7. The cation exchange membrane as claimed in claim 1, wherein the cation exchange membrane has an ion exchange capacity of 0.30 meq/g or higher.

8. The cation exchange membrane as claimed in claim 1, wherein the cation exchange membrane has a membrane resistance of 10 Ωcm$^2$ or lower.

9. The cation exchange membrane as claimed in claim 1, wherein the domain size (X) satisfies 1 nm<X≤150 nm.

10. The cation exchange membrane as claimed in claim 1, wherein the domain size (X) satisfies 3 nm<X≤150 nm.

11. The cation exchange membrane as claimed in claim 1, consisting essentially of the polyvinyl alcohol copolymer.

12. A method for producing a cation exchange membrane recited in claim 1, comprising:
   forming a membrane from a polyvinyl alcohol copolymer which is adjusted to contain salts in a proportion that the salt weight (C) relative to the polyvinyl alcohol copolymer weight (P) is [(C)/(P)] of 4.5/95.5 or lower.

13. The method as claimed in claim 12, wherein the salts are inevitable impurities in the polyvinyl alcohol copolymer.

14. The method as claimed in claim 12, wherein the salt is removed by carrying out precipitation or re-precipitation from a solution of the polyvinyl alcohol copolymer containing the salt to adjust a weight ratio of the salt based on the polyvinyl alcohol copolymer to a predetermined value or lower.

15. The method as claimed in claim 12, wherein after membrane formation, the obtained membrane is crosslinked.

16. The method as claimed in claim 12, further comprising:
   preparing a film from a polyvinyl alcohol copolymer solution containing a salt,
   heat-treating the obtained film at a temperature of 100° C. or higher,
   conducting crosslinking treatment of the heated film with a dialdehyde compound under acidic condition in water, an alcohol, or a mixed solvent thereof, and
   washing the crosslinked resultant with water to obtain a membrane.

* * * * *